Figures 1, 2:
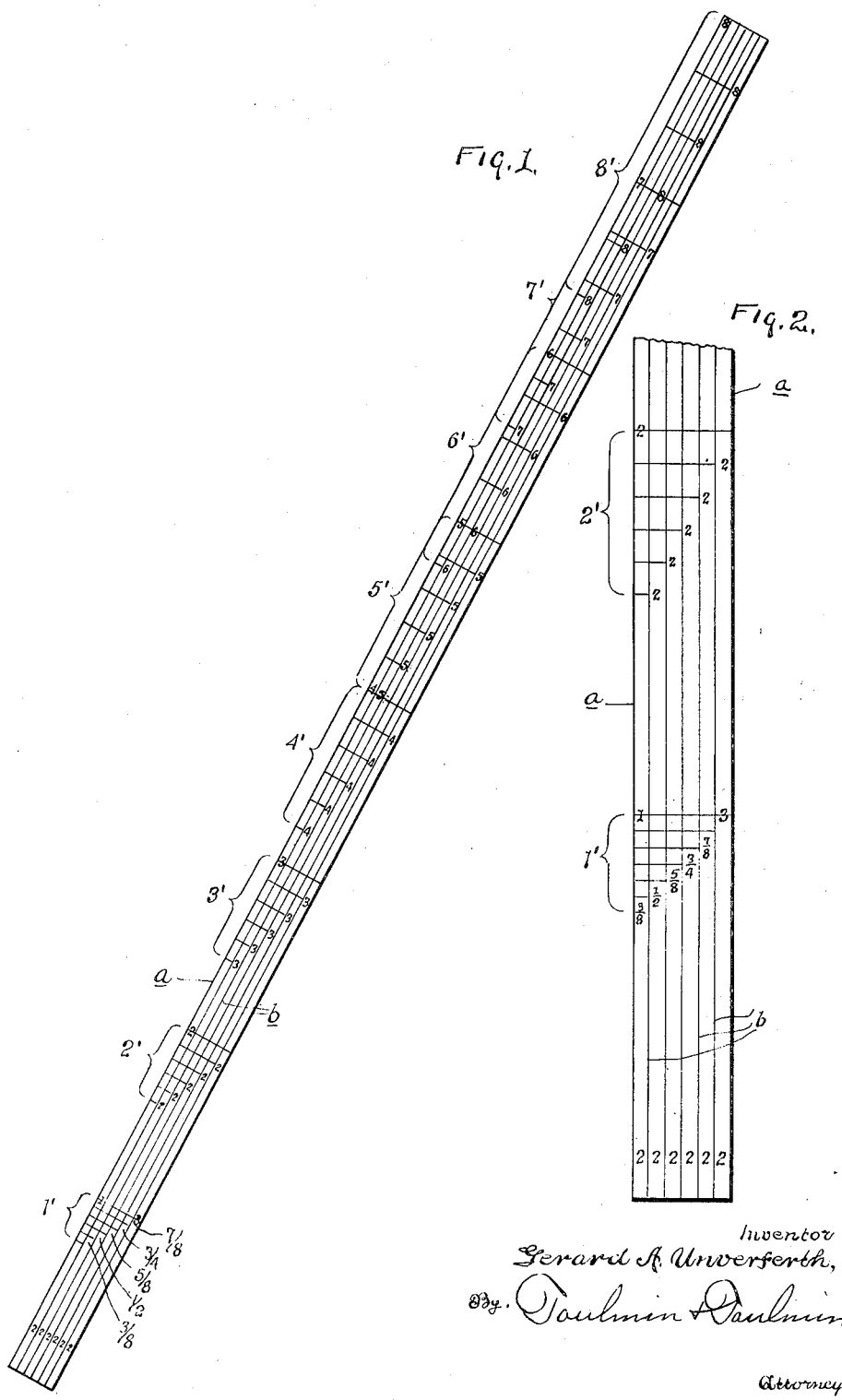

Aug. 3, 1926.

G. A. UNVERFERTH 1,594,862

BRICK MASON'S RULER

Filed Oct. 5, 1923

Inventor
Gerard A. Unverferth,
By Toulmin & Toulmin,
Attorneys

Patented Aug. 3, 1926.

1,594,862

UNITED STATES PATENT OFFICE.

GERARD A. UNVERFERTH, OF DAYTON, OHIO.

BRICK-MASON'S RULER.

Application filed October 5, 1923. Serial No. 666,833.

This invention relates to improvements in what I term a brick mason's rule.

The object of the invention is to provide a ruler which will enable a brick mason to determine the thickness of the mortar line between the courses of bricks and the number of courses of bricks whenever a given sized opening is specified by the architect. For instance, if the architect were to provide in the specification that from the bottom to the top of an opening there should be one foot and nine inches, the brick layer would have to determine how thick to make the mortar line and how many courses of brick would be required. This ruler determines these factors without calculation, as will appear from the detail description hereinafter given.

In the accompanying drawings:—

Fig. 1 is a side elevation of a ruler embodying my invention; and

Fig. 2 is a similar view of a portion of the ruler on an enlarged scale to facilitate reading the characters on the ruler.

The reference letter *a* designates a strip of any suitable material, preferably metal, say two feet long, of appropriate width, say 6/8ths of an inch.

On this strip are wrought by any suitable means a series of longitudinal lines, indicated at *b*. These lines are to be 1/8th of an inch apart, so that the space they indicate between them in this case represents that fraction of an inch known as one-eighth.

Then I also apply to the rule a series of transverse lines constituting a succession of groups, say the first group indicated by the reference numeral 1', the second group by 2', the third group by 3', the fourth group by 4', the fifth group by 5', the sixth group by 6', the seventh group by 7' and the eighth and final group in the example shown by 8'. As there are three inches between the longest lines of each two groups, the eight groups therefore make eight times three, or 24 inches in a rule of the length assumed in the drawings.

It will further be seen that the first or shortest line in each group extends across one longitudinal space between the longitudinal lines; that the next line in each group extends across two of such spaces, the next across three spaces, the next across four spaces, the next across five spaces and the next or longest line of each group across six spaces or all of the spaces in the example illustrated.

Now with reference to the spaces between the transverse lines of each group it will be noted and understood that the lines of the first group are 1/8th of an inch apart or a distance equal to the space between the longitudinal lines. That the spaces between the next or second group are 2/8ths of an inch or equal in distance to the width of two longitudinal spaces. That the distances between the lines of the third group are 3/8ths of an inch which makes the space between each two horizontal lines of this third group equal to the space between three longitudinal lines. That the space between the lines of the fourth group are 4/8ths of an inch and so on, the spaces between the lines of each succeeding group being 1/8th of an inch greater than the spaces between the lines of the preceding group.

The numerals 2 near one end of the ruler and the fractions 3/8, 1/2, 5/8, 3/4 and 7/8 designate, respectively, that there are 2 3/8 inches between the said end of the ruler and the first short line of group 1' of transverse lines; that there are 2 1/2 inches between such end of the ruler and the second or next transverse line; that there are 2 5/8 inches between such end of the ruler and the next transverse line; that there are 2 3/4 inches between such end of the rule and the next transverse line and that there are 2 7/8 inches between such end of the ruler and the next transverse line.

The numeral 3 adjacent the numeral 7/8ths indicates three inches between the lower end of the ruler and the top cross line.

The succession of numerals 2 placed in an inclined position at the ends of the transverse lines in groups 2' indicate 2/8ths of an inch between such transverse lines; the numeral 3 in inclined position in the next or third group indicates 3/8ths of an inch between the horizontal lines and so on, the inclinely positioned numerals 4, 5, 6, 7 and 8, respectively, indicating so many eighths of an inch between the horizontal lines, the fours indicating 4/8ths, the fives 5/8ths, the sixes 6/8ths, the sevens 7/8ths and the eights 8/8ths.

It will be observed that the first or shortest line in the transverse lines of groups 6' is just below the longest line in group 5'; that the same is true of the shortest line in group 7' with respect to the longest line in group 6' and so on upward. This overlapping is due to the progressive increase in the width of the space between the horizontal lines of one group as compared with the space between the horizontal lines of the next group, which spaces in each group increase in width 1/8th of an inch over the preceding group. But this overlapping does not interfere at all with the use of the rule and the results it determines.

Having now described the structural features of my improved rule I will give an example of the manner of using it, the purpose being to show by the rule how thick the mortar lines should be and how many courses of brick are required for any given size of opening.

Assume an opening of say one foot and nine inches in height. The brick mason will stand this ruler up alongside of the opening. In this example the top of the opening will come in line with the longest transverse line marked in the seventh group indicated in Fig. 1. He will, therefore, know that seven courses of brick will be required. To determine the width of the mortar joint he will observe this transverse line 7 extends across the entire face of the ruler, for which reason he will glance at the longest transverse line in the first group. From this line to the first or shortest line in that group there are 5/8ths of an inch. This indicates that the mortar joint must be 5/8ths of an inch thick.

Such is the system or mode of using this ruler. Once the brick mason learns this he can apply the rule to any particular height of opening he may be confronted with and at once be advised of the number of courses of brick and the thickness of each mortar line required for that opening.

The assumption in the use of the ruler is the common one based on the fact that bricks are practically always 2 3/8ths inches thick.

Having thus fully described my invention, what I claim as new and desire to secure by Letters Patent, is:—

A rule operative to determine the number of courses of brick and the thickness of the individual mortar layers required to complete a given measurement of work, consisting of an elongated strip having displayed thereon longitudinal and transverse indicating lines together with related measuring indicia, the longitudinal lines being spaced equal distances apart and the transverse lines being divided into successive groups, the transverse lines of each group being spaced equal distances apart and with the spaces between the lines of a succeeding group of a greater width than the spaces of a preceding group, the increase in width of the spaces having a definite regular progression in the successive groups, the transverse lines of each group extending across the longitudinal lines in stepped progressed relation to each other and successively terminating in the longitudinal lines, the successive groups of transverse lines being consecutively numbered to designate the brick courses and the first group provided with a scale to designate thicknesses of mortar layers, a particular transverse line operating to indicate the number of brick courses and in conjunction with its terminal longitudinal line leading to said scale of the first transverse group operating to designate the individual thickness of the interposed mortar layers required to complete the work in the linear measurement indicated on the rule by said particular transverse line.

In testimony whereof, I affix my signature.

GERARD A. UNVERFERTH.